March 24, 1925.
G. A. KING
CARPET FASTENER
Filed May 3, 1924
1,531,254
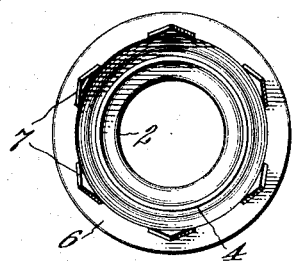
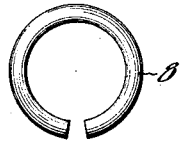
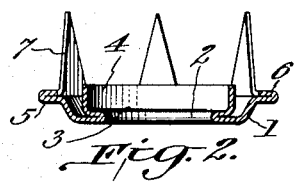
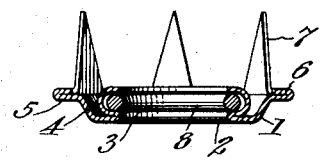
Inventor:
George A. King
by
W. H. Finnel
Attorney.

Patented Mar. 24, 1925.

1,531,254

UNITED STATES PATENT OFFICE.

GEORGE A. KING, OF WATERBURY, CONNECTICUT, ASSIGNOR TO SCOVILL MANUFACTURING COMPANY, OF WATERBURY, CONNECTICUT, A CORPORATION OF CONNECTICUT.

CARPET FASTENER.

Application filed May 3, 1924. Serial No. 710,841.

*To all whom it may concern:*

Be it known that I, GEORGE A. KING, a citizen of the United States, residing at Waterbury, in the county of New Haven and State of Connecticut, have invented a certain new and useful Improvement in Carpet Fasteners, of which the following is a full, clear, and exact description.

The primary object of this invention is to provide a simple, compact and efficient separable fastener for securing a carpet or rug in a motor vehicle.

As is known, fasteners of this type comprise a socket or female member to be attached to the carpet or rug and a head or male member to be attached to the floor, the female member being snapped into engagement with the male member to hold the carpet or rug in place.

The female member of this invention is of the resilient type, and comprises a one piece self-attaching body having a lip adapted to be closed down over the resilient member,—in the preferred construction a spring ring—to hold the resilient member in operative position, as I will proceed now to explain and finally claim.

In the accompanying drawings illustrating the invention, in the several figures of which like parts are similarly designated, Figure 1 is an inverted plan view. Fig. 2 is a cross-section of the body without the resilient member. Fig. 3 is a cross-section of the complete device. Figs. 4 and 5 show, respectively, a plan and an edge view of the resilient member.

The body comprises a piece of metal shaped to form the raised portion 1, having the head-receiving opening 2, the edge of which is reverted to form the ledge 3 and the flange 4, which parts constitute the lip herein referred to. The base of the raised portion is extended laterally to form the flange 5, and the edge of this flange is reverted as indicated by 6. The inner edge of this reverted portion 6 is provided with a number of prongs 7 normal thereto.

By setting the prongs 7 inwardly from the edge of the fastener they are concealed and a more sightly finish is obtained, and moreover, when these prongs are clinched in the act of attaching the fastener to a carpet or rug, the points of the prongs are curled up beneath the reverted portion 6 and thus covered in and concealed from view.

The resilient element 8 of the socket may be an unclosed ring, of spring wire, which is laid on the ledge 3 and held in place thereon by closing down the flange 4 over it as shown in Fig. 3, thus forming a recess in which the spring ring may expand under pressure of the complemental head member of the fastener as it is snapped into the socket, and also as it is separated therefrom, the resilience of the spring serving to hold the socket and head in engagement.

As will be understood, the body of the fastener is made in one piece, including the raised central portion, the surrounding flange, the attaching prongs, and the means for receiving and holding the resilient member, and thus the entire fastener is composed of ony two members, and for practical purposes is indestructible.

Variations in details of construction are permissible within the principle of the invention as herein explained and hereinafter claimed, and the use to which the invention is capable of being put is not limited by anything herein.

What I claim is:—

1. A snap fastener socket member, having an open spring ring for engaging a complemental head, and a supporting and attaching member for said ring comprising a one-piece body having a central opening, said central opening having a surrounding ledge on which the ring is placed, an overlapping ring retaining flange, and prongs for attaching the socket to an object, said supporting and attaching member and its constituent parts being made in one integral piece with the body of the socket.

2. A snap fastener socket member, having an open spring ring for engaging a complemental head, and a supporting and attaching member for said ring comprising a one-piece body having a central opening and a surrounding ring retaining lip, and prongs for attaching the socket to an object, said prongs being inset from the marginal edge of the body, said supporting and attaching member and its constituent parts being made in one integral piece with the body of the socket.

In testimony whereof I have hereunto set my hand this first day of May A. D. 1924.

GEORGE A. KING.

Witnesses:
H. B. RIGGS,
W. L. WOOD.